US012208631B2

(12) United States Patent
Fernández Vázquez et al.

(10) Patent No.: US 12,208,631 B2
(45) Date of Patent: Jan. 28, 2025

(54) MACHINE FOR THE DIGITAL PRINTING OF SHEETS OF GLASS THROUGHOUT ITS ENTIRE SURFACE, INCLUDING ITS PERIMETER

(71) Applicant: TECGLASS SL, Lalin (ES)

(72) Inventors: Juan Javier Fernández Vázquez, Lalin (ES); José Manuel Barros López, Lalin (ES)

(73) Assignee: TECGLASS SL, Lalin (ES)

( * ) Notice: Subject to any disclaimer, the term of this patent is extended or adjusted under 35 U.S.C. 154(b) by 140 days.

(21) Appl. No.: 18/018,041

(22) PCT Filed: Jul. 26, 2021

(86) PCT No.: PCT/ES2021/070561
§ 371 (c)(1),
(2) Date: Jan. 26, 2023

(87) PCT Pub. No.: WO2022/023608
PCT Pub. Date: Feb. 3, 2022

(65) Prior Publication Data

US 2023/0278348 A1 Sep. 7, 2023

(30) Foreign Application Priority Data

Jul. 27, 2020 (ES) ............................ ES202031666U

(51) Int. Cl.
*B41J 3/407* (2006.01)

(52) U.S. Cl.
CPC .................................... *B41J 3/407* (2013.01)

(58) Field of Classification Search
CPC ................................ B41M 1/34; B41M 5/007
See application file for complete search history.

(56) References Cited

U.S. PATENT DOCUMENTS

2004/0207686 A1 10/2004 DeBoard et al.
2009/0189950 A1 * 7/2009 Kojima ...................... B41J 3/28 347/40
2013/0008333 A1 * 1/2013 Peter ...................... B41J 25/308 101/484
2013/0215196 A1 8/2013 Lewartowski et al.
2020/0122456 A1 * 4/2020 Vazquez ............... C03C 17/002

FOREIGN PATENT DOCUMENTS

CN 109986890 A 7/2019
WO 2014060066 A1 4/2014

OTHER PUBLICATIONS

International Search Report dated Oct. 25, 2021.

* cited by examiner

*Primary Examiner* — Scott A Richmond
(74) *Attorney, Agent, or Firm* — Dickinson Wright PLLC

(57) ABSTRACT

A machine for digital printing of glass sheets on their entire surface, including their border, comprising a printing table (1), a printing carriage (2) that travels along the printing table (1) on a number of travel guides (3), and a printing bridge (4) associated with the printing carriage (2) on which printing modules or heads (5) travel, characterized in that it has a head controller (6) that manages up to four encoders, which allows four simultaneous printing modes:

Modality 1 along the X axis in single pass.
Modality 2 along the Y axis in single pass.
Modality 3 along the X axis in multipass.
Modality 4 along the Y axis in multipass.

1 Claim, 2 Drawing Sheets

MACHINE FOR THE DIGITAL PRINTING OF SHEETS OF GLASS THROUGHOUT ITS ENTIRE SURFACE, INCLUDING ITS PERIMETER

CROSS-REFERENCE TO RELATED APPLICATIONS

This application is a U.S. National Stage of International Application No. PCT/ES2021/070561, filed on Jul. 26, 2021, which claims priority to Spanish Patent Application No. U202031666 filed on Jul. 27, 2020, the entire disclosures of which are incorporated herein in their entireties.

OBJECT OF THE INVENTION

The object of the present invention, as indicated by its title, is a digital printing machine for glass plates on their entire surface, including their border.

The present invention is characterised by the special design and configuration of each and every one of the elements that are part of the invention and the functionality associated with them, in such a way that a machine for digital glass printing is achieved, which allows printing of the entire surface in addition to the borders of the glass.

Therefore, the present invention belongs to the field of digital printing systems.

BACKGROUND OF THE INVENTION

In the prior art the machine of ES2640053 is known, which allows the printing of both outer and inner edges and continuously, of rectangular or multiform glass sheets whose multiple sides form angles having at least one point in common, each edge describing a linear function defined by the equation that defines a line (y=mx+b).

In the prior art model the edge printing group (perpendicular heads) print by sending the position information to a single encoder input electronic converter, then changing the encoder by means of a switch depending on the direction to be printed. This does not allow printing in multipass with both groups of heads (0 degree and 90 degree groups)

With the machine described in said patent, only the border can be printed. To combine the printing of the entire part and the border a system of perpendicular heads must be mounted on a complex machine that carries the entire printing system.

In other words, in current machines that allow printing both the edge and the surface of the glass in its entirety, there is a part dedicated to the printing of the frame or border and another part dedicated to multipass printing, which complicates the final machine and makes it more expensive Therefore, the object of the present invention is to develop a machine for digital glass printing in such a way that the same edge printing unit can be used to print images in multipass using either of the two groups of heads (horizontal or vertical). A machine such as the one described below has been developed, described in its entirety in the first claim.

DESCRIPTION OF THE INVENTION

The object of the present invention is a machine for digital glass printing on the entire surface including the border that has a set of printing units provided with several heads governed by a head controller that allow up to four encoders to be managed.

Once electronics are obtained with more encoder inputs than one, the encoders can be simultaneously connected, and a head trip signal can be sent based on the position without having to switch between the printing modules.

In this way one can print:

In both directions in a single pass

In both directions in multipass.

Suppose there is a machine with four simultaneous printing modes on the same print head:

Modality 1 along the X axis in single pass.

Modality 2 along the Y axis in single pass.

Modality 3 along the X axis in multipass.

Modality 4 along the Y axis in multipass.

This would then be the only machine on the market capable of printing on both axes at the same time in a single pass and on both axes in multipass using the same heads.

Unless indicated otherwise, all the technical and scientific elements used in this specification have the meaning usually understood by a person skilled in the art to which this invention belongs. In the practice of this invention, procedures, and materials similar or equivalent to those described in the report can be used.

In the description and claims, the word "comprises" and its variants do not intend to exclude other technical characteristics, additives, components or steps. For persons skilled in the art, other objects, advantages, and characteristics of the invention will be partly inferred from the description and partly from the practice of the invention.

EXPLANATION OF THE FIGURES

In order to complement the description being made herein, and with the object of aiding the better understanding of the characteristics of the invention, in accordance with a preferred practical embodiment thereof, said description is accompanied, as an integral part thereof, by a set of drawings where, in an illustrative and non-limiting manner, the following has been represented.

PREFERRED EMBODIMENT OF THE INVENTION

In view of the figures, a preferred embodiment of the proposed invention is described below.

Figure 1:
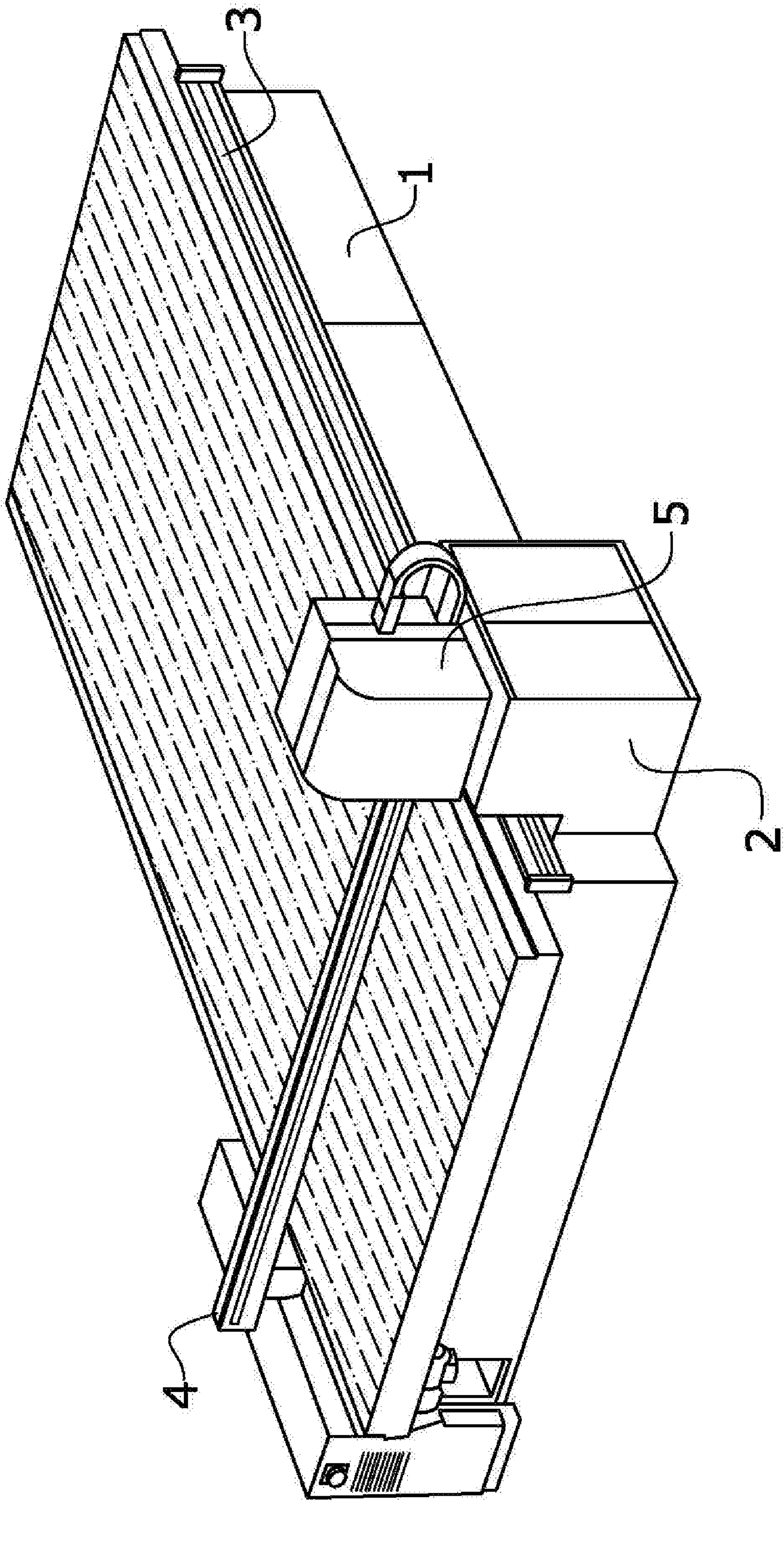
FIG. 1 shows a machine that is the object of the invention.
Figure 2:
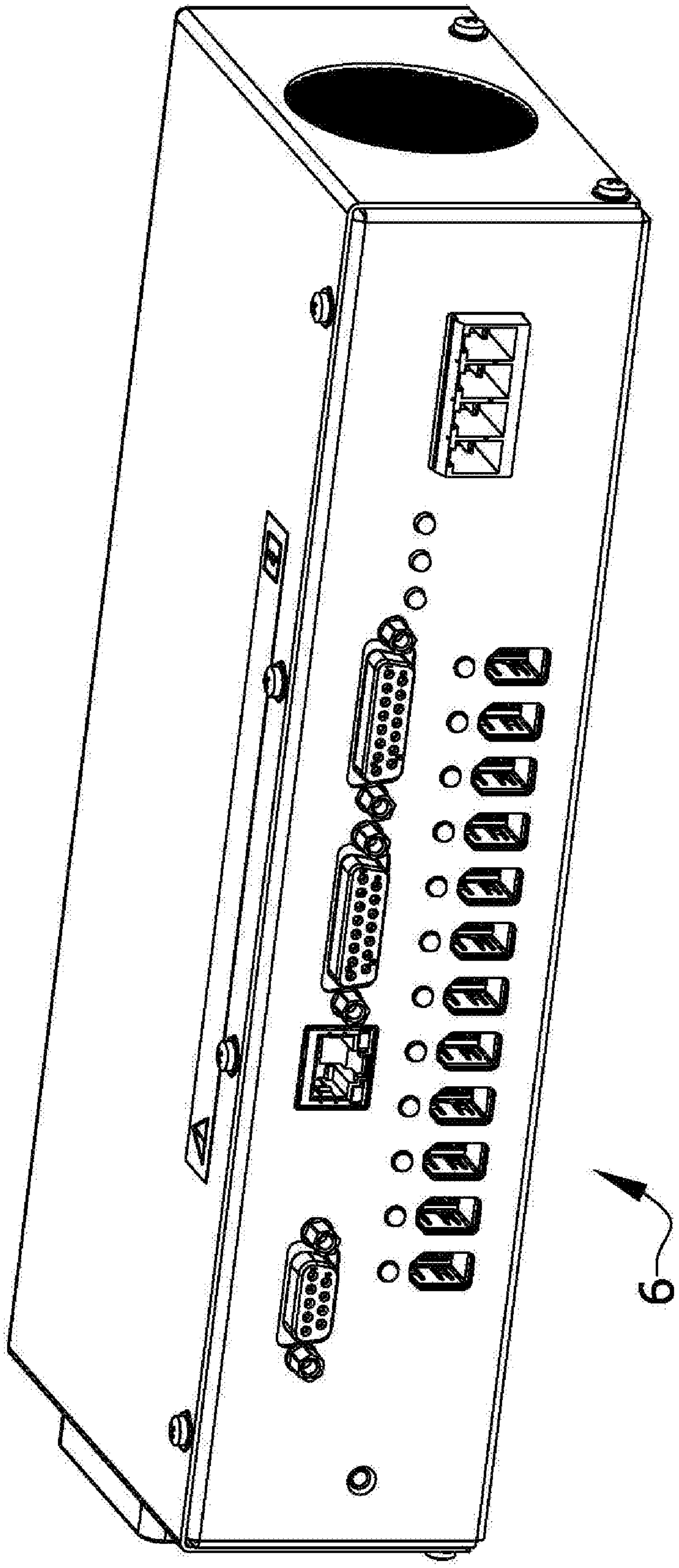
FIG. 2 shows a head controller that allows up to four encoders to be managed.

FIG. 1 shows a machine for digital glass printing that has a printing table (1) a printing carriage (2) that travels along the printing table (1) along some travel guides (3), a printing bridge (4) being associated with the printing carriage (2) on which printing modules or heads (5) travel, characterized in that it has a head controller (6) that manages up to four encoders.

The fact that the head controller (6) manages up to four encoders makes it possible to print simultaneously on both axes by means of a single pass system and on both axes in multipass with the same heads.

The machine thus exhibits four simultaneous printing modes on the same print heads (5).

Modality 1 along the X axis in single pass.

Modality 2 along the Y axis in single pass.

Modality 3 along the X axis in multipass.

Modality 4 along the Y axis in multipass.

Having sufficiently described the nature of the present invention, in addition to the manner in which to put it into practice, it is hereby stated that, in its essence, it may be put into practice in other embodiments that differ in detail from that indicated by way of example, and to which the protection equally applies, provided that its main principle is not altered, changed or modified.

The invention claimed is:

1. A machine for digital printing an entirety of a top surface of a glass sheet including a border of the top surface, said machine comprising:

a printing table, a printing carriage that moves along the printing table along travel guides, a printing bridge being associated with the printing carriage on which printing modules or heads move, and a head controller that manages up to four encoders, wherein the head controller is configured to provide four simultaneous printing modes:

modality 1 along an X axis in single pass;

modality 2 along a Y axis in single pass;

modality 3 along the X axis in multipass; and modality 4 along the Y axis in multipass.

* * * * *